(12) United States Patent
Nakajima et al.

(10) Patent No.: US 10,926,731 B2
(45) Date of Patent: Feb. 23, 2021

(54) AIRBAG DEVICE

(71) Applicant: AUTOLIV DEVELOPMENT AB, Vargarda (SE)

(72) Inventors: Yutaka Nakajima, Yokohama (JP); Ryota Ishigaki, Yokohama (JP); Takanari Muroya, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 63 days.

(21) Appl. No.: 16/360,141

(22) Filed: Mar. 21, 2019

(65) Prior Publication Data
US 2019/0291681 A1 Sep. 26, 2019

(30) Foreign Application Priority Data

Mar. 23, 2018 (JP) .............................. JP2018-056244
Jan. 15, 2019 (JP) .............................. JP2019-004011

(51) Int. Cl.
| | |
|---|---|
| *B60R 21/216* | (2011.01) |
| *B60R 21/205* | (2011.01) |
| *B60R 21/233* | (2006.01) |
| *B60R 21/231* | (2011.01) |
| *B60R 21/00* | (2006.01) |
| *B60R 21/01* | (2006.01) |
| *B60R 21/2338* | (2011.01) |

(52) U.S. Cl.
CPC .......... *B60R 21/216* (2013.01); *B60R 21/205* (2013.01); *B60R 21/231* (2013.01); *B60R 21/233* (2013.01); *B60R 2021/0048* (2013.01); *B60R 2021/01238* (2013.01); *B60R 2021/23107* (2013.01); *B60R 2021/23382* (2013.01); *B60R 2021/23386* (2013.01)

(58) Field of Classification Search
CPC ... B60R 21/216; B60R 21/231; B60R 21/205; B60R 21/233; B60R 2021/0048; B60R 2021/01238; B60R 2021/23107; B60R 2021/23382; B60R 2021/23386
See application file for complete search history.

(56) References Cited

U.S. PATENT DOCUMENTS

| | | | |
|---|---|---|---|
| 8,678,429 B2 | 3/2014 | Nagasawa et al. | |
| 10,065,594 B2 * | 9/2018 | Fukawatase | ........ B60R 21/2338 |

(Continued)

FOREIGN PATENT DOCUMENTS

JP 2013-14176 A 1/2013

*Primary Examiner* — Darlene P Condra
(74) *Attorney, Agent, or Firm* — Dickinson Wright PLLC

(57) ABSTRACT

A cushion of an airbag device includes an inner inflating section convexly inflating toward the rear of a vehicle and restraining the head of an occupant from the front of the vehicle, protrusions provided to the sides of the inner inflating section in a vehicle width direction and capable of inflating so as to protrude further toward the rear of the vehicle than the inner inflating section, and outer inflating sections provided between the inner inflating section and the protrusions and temporarily convexly inflating toward the rear of the vehicle within a smaller range than the expansion range of the inner inflating section and the protrusions. The outer inflating sections are squashed by the inner inflating section and the protrusions and, as a result, the protrusions are in a posture of being pulled toward a side of the inner inflating section.

14 Claims, 8 Drawing Sheets

(56) References Cited

U.S. PATENT DOCUMENTS

| | | | | |
|---|---|---|---|---|
| 2006/0249943 | A1* | 11/2006 | Bauer | B60R 21/231 |
| | | | | 280/743.2 |
| 2010/0001495 | A1* | 1/2010 | Sekino | B60R 21/233 |
| | | | | 280/729 |
| 2016/0009242 | A1* | 1/2016 | Fukawatase | B60R 21/2338 |
| | | | | 280/730.1 |
| 2018/0029557 | A1* | 2/2018 | Yamada | B60R 21/2338 |
| 2018/0056922 | A1* | 3/2018 | Yamada | B60R 21/233 |
| 2018/0065583 | A1* | 3/2018 | Tabushi | B60R 21/235 |
| 2018/0065587 | A1* | 3/2018 | Maenishi | B60R 21/2338 |
| 2018/0126945 | A1* | 5/2018 | Aranzulla | B60R 21/2338 |
| 2018/0126946 | A1* | 5/2018 | Bausch | B60R 21/233 |
| 2018/0251093 | A1* | 9/2018 | Rose | B60R 21/239 |
| 2018/0354447 | A1* | 12/2018 | Nakajima | B60R 21/231 |
| 2019/0193671 | A1* | 6/2019 | Hotta | B60R 21/2338 |

* cited by examiner

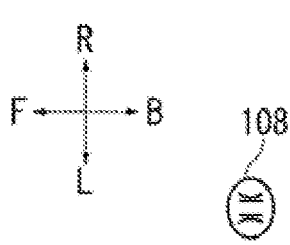
FIG. 4(A)
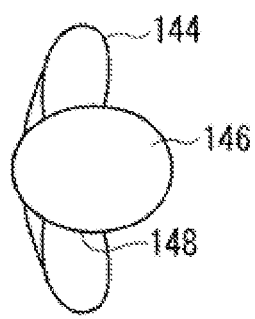
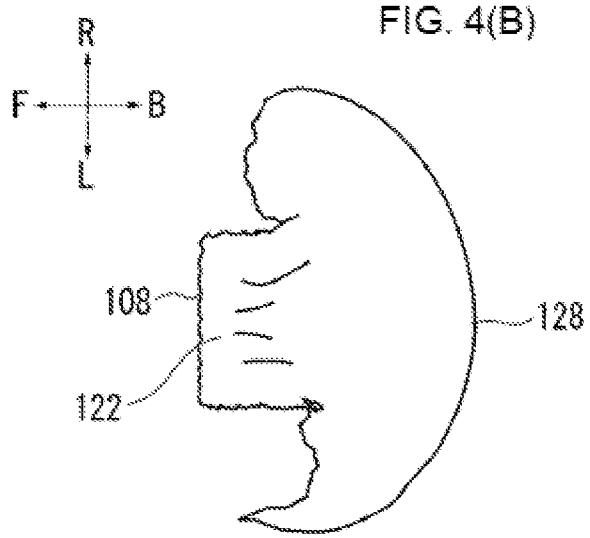
FIG. 4(B)
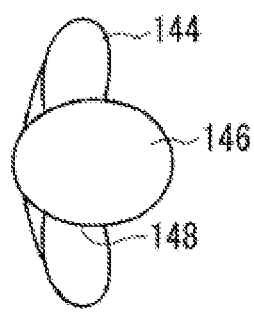
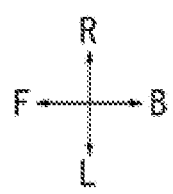
FIG. 4(C)
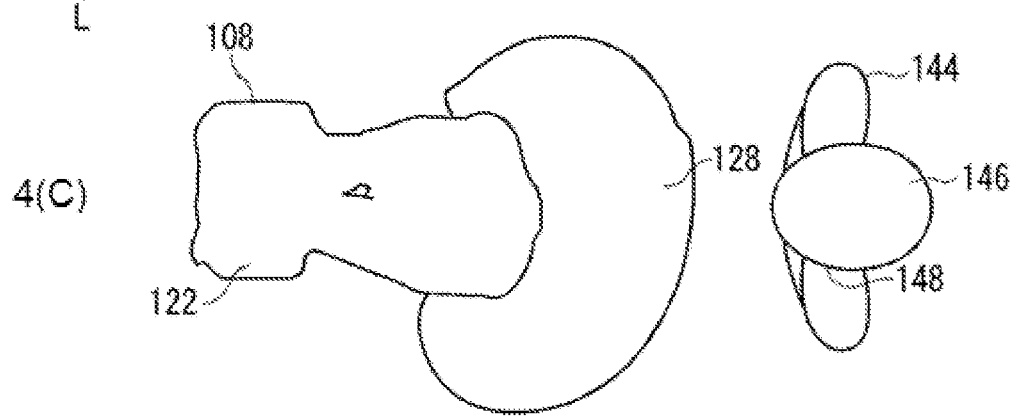

SECTION D-D

SECTION E-E

AIRBAG DEVICE

CROSS-REFERENCE TO RELATED APPLICATIONS

This application claims the benefit of priority under 35 U.S.C. § 119 to Japanese Patent Application No. 2018-056244, filed Mar. 23, 2018, and Japanese Patent Application No. 2019-004011, filed Jan. 15, 2019, the contents of which are incorporated herein by reference in their entirety.

FIELD OF THE INVENTION

The present invention relates to an airbag device which is installed in a vehicle and which includes a bag-like cushion that inflates and deploys in front of a seat.

BACKGROUND

Airbag devices have almost become standard equipment in recent passenger car and a light truck vehicles. An airbag device is a safety device which operates during an emergency such as a vehicle collision and which receives and protects an occupant using an airbag cushion that inflates and deploys under gas pressure. Airbag devices come in various types in accordance with installation locations or applications. For example, in order to protect occupants of front seats from mainly impact in a longitudinal direction, a driver's seat is provided with a front airbag at a center of a steering wheel while a passenger airbag is provided in a vicinity of a passenger seat inside an instrument panel or in a neighboring region thereof. In addition, in order to protect respective occupants of front and back row seats from a side collision or from a subsequently occurring rollover, a curtain airbag which inflates and deploys along a side window is provided in a vicinity of a ceiling (roof) of a wall part and a side airbag which inflates and deploys to an immediate side of an occupant is provided in a side part of a seat.

Airbag cushions of various airbag devices may be created in a shape conforming to a portion of the body of an occupant so that the occupant can be restrained in an efficient manner. For example, an airbag body 11 described in FIG. 1 in Japanese Patent Application Laid-open No. 2013-14176 is provided with a first extending section 14a and a second extending section 14b for protecting the head of an occupant. It is described that, according to the configuration of the above-referenced Japanese Patent Application, the head up to sides thereof can be covered and protected by the first extending section 14a and the like.

Modern airbags are required to be capable of also accommodating irregular collisions and impact such as so-called oblique collisions in which an impact is applied to a vehicle from an obliquely longitudinal direction. In an oblique collision, an occupant enters an airbag cushion positioned in front of a seat at an irregular angle such as from an oblique direction. In such cases, when the head of the occupant comes into contact with the airbag cushion in front of the seat, a rotation around the neck when viewed from above may occur on the head. Since such a rotation of the head is likely to become a factor that increases an injury value of the occupant from the perspective of the structure of the human body, there is a demand for preventing such rotations in an efficient manner.

In the above-described application, it is mentioned that using the first extending section 14a and the second extending section 14b enables the head of an occupant to be protected even when the head shifts in a vehicle width direction upon an occurrence of an impact to the vehicle. However, as far as shown in FIG. 5 of the above-described application and the like, since the first extending section 14a and the like lack thickness in the vehicle width direction, there is a risk that shapes of the first extending section 14a and the like cannot be retained when restraining the head of the occupant during an oblique collision.

SUMMARY OF THE INVENTION

In consideration of such problems, an object of the present invention is to provide an airbag device which is capable of efficiently suppressing an injury value of an occupant during an impact.

In order to address the problems described above, a representative configuration of an airbag device according to the present invention is an airbag device which is installed in a vehicle and which includes a bag-like cushion that inflates and deploys in front of a seat, the cushion including: an inner inflating section which convexly inflates toward the rear of the vehicle and which restrains the head of an occupant from the front of the vehicle; at least one protrusion which is provided to the side of the inner inflating section in a vehicle width direction and which is capable of inflating so as to protrude further toward the rear of the vehicle than the inner inflating section; and at least one outer inflating section which is provided between the inner inflating section and the protrusion and which temporarily convexly inflates toward the rear of the vehicle within a smaller range than the expansion range of the inner inflating section and the protrusion, wherein the outer inflating section is squashed by the inner inflating section and the protrusion, and the protrusion is in a posture of being pulled toward a side of the inner inflating section.

According to the configuration described above, a force oriented toward the side of the inner inflating section is applied to the protrusion and a restraining force of a temporal region of the occupant by the protrusion is improved. Therefore, for example, since even a rotation of the head of the occupant can be absorbed by the protrusion, an injury value of the occupant can be efficiently suppressed.

In order to solve the problems described above, another representative configuration of an airbag device according to the present invention is an airbag device which is installed in a vehicle and which includes a bag-like cushion that inflates and deploys in front of a seat, the cushion including: an inner inflating section which convexly inflates toward the rear of the vehicle and which restrains the head of an occupant from the front of the vehicle; at least one protrusion which is provided to the side of the inner inflating section in a vehicle width direction and which is capable of inflating so as to protrude toward the rear of the vehicle; and at least one outer inflating section which is provided between the inner inflating section and the protrusion and which convexly inflates toward the rear of the vehicle within a smaller range than the expansion range of the inner inflating section and the protrusion.

Even if the outer inflating section is not squashed by the inner inflating section and the protrusion as in the configuration described above, the protrusion can absorb a rotation of the head of the occupant and efficiently suppress an injury value of the occupant. This is because, since the outer inflating section convexly inflates toward the rear of the vehicle within a smaller range than the expansion range of the inner inflating section and the protrusion, an effect of pulling the protrusion toward the side of the inner inflating section is produced when the occupant comes into contact with the inner inflating section.

The effect described above can be produced even when the at least one protrusion is capable of inflating so as to protrude further toward the rear of the vehicle than the inner inflating section and when the at least one protrusion is capable of inflating so as to protrude toward the rear of the vehicle by an amount comparable to the protruding amount of the inner inflating section. In addition, the effect described above is produced in a more remarkable manner when the at least one outer inflating section convexly inflates toward the rear of the vehicle within a smaller range in a vehicle width direction than the expansion range of the inner inflating section and the protrusion.

A curvature radius of the outer inflating section described above when inflating is favorably smaller than the curvature radii of the inner inflating section and the protrusion. According to this configuration, a rigidity of the outer inflating section becomes lower than rigidities of the inner inflating section and the protrusion. Therefore, the outer inflating section is squashed between the inner inflating section and the protrusion and a force oriented toward the side of the inner inflating section can be efficiently applied to the protrusion.

The protrusion described above may be provided to both sides of a forward restraining section in the vehicle width direction. According to this configuration, a rotation of the head of the occupant can be absorbed on both sides in the vehicle width direction.

The airbag device may further include: at least one inner tether, one end of which is connected to a portion constituting a boundary between the inner inflating section and the outer inflating section inside the cushion, and which is tensioned so as to pull the portion toward the front of the vehicle. The airbag device may further include: at least one outer tether, one end of which is connected to a portion constituting a boundary between the outer inflating section and the protrusion inside the cushion, and which is tensioned so as to pull the portion toward the front of the vehicle.

Providing the inner tether and the outer tether described above enables the inner inflating section and the outer inflating section to be efficiently convexly inflated toward the rear of the vehicle.

The outer inflating section described above may be provided to both sides of the inner inflating section in the vehicle width direction, and the inner tether and the outer tether may be provided singly on each of left and right sides in the vehicle width direction. According to this configuration, the outer inflating section can be preferably formed on both sides in the vehicle width direction.

At least one of the one end of the outer tether and the one end of the inner tether described above favorably has a vertical dimension sufficient to cover a vertical range of the protrusion. According to this configuration, since the outer inflating section can be formed so as to cover the vertical range of the protrusion, a force oriented toward the side of the inner inflating section can be efficiently created on the protrusion.

Other ends of the outer tether and the inner tether described above are favorably connected to a portion that faces a forward restraining section inside the cushion. According to this configuration, the forward restraining section can be efficiently pulled by the inner tether and the outer tether and the outer inflating section can be preferably formed.

According to the present invention, an airbag device which is capable of efficiently suppressing an injury value of an occupant during an emergency can be provided.

BRIEF DESCRIPTION OF THE DRAWINGS

FIGS. 4(A) to 4(C) are diagrams illustrating a process of a cushion shown in FIG. 3(A) restraining an occupant;

FIGS. 7(A) and 7(B) are diagrams illustrating a modification of the cushion shown in FIG. 3(A) and the like; and FIGS. 8(A) to 8(C) are diagrams illustrating a modification of the cushion shown in FIG. 3(A) and the like.

DETAILED DESCRIPTION

Figure 1A:
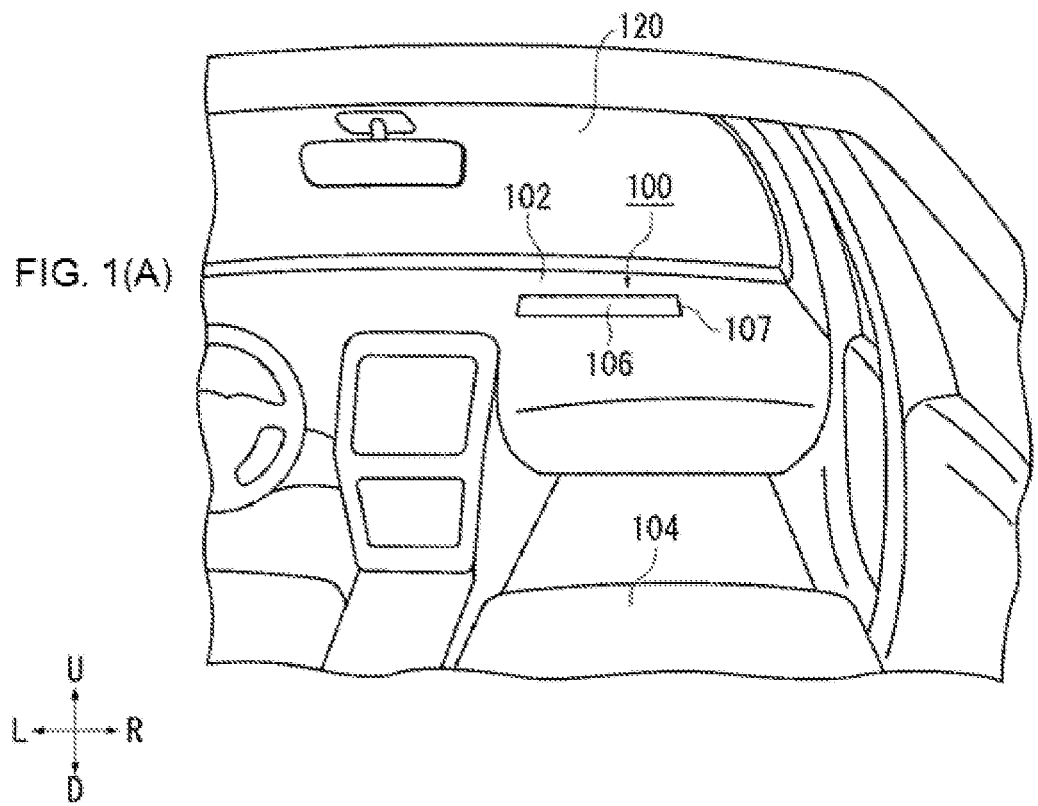
FIGS. 1(A) and 1(B) are diagrams illustrating an outline of an airbag device according to an embodiment of the present invention.

Hereinafter, a preferred embodiment of the present invention will be described in detail with reference to the accompanying drawings. Dimensions, materials, specific numerical values, and the like described in the embodiment are simply examples provided for facilitating understanding of the present invention and are not intended to limit the invention unless otherwise noted. Moreover, for elements having functions or configurations which are substantially the same in the present specification and in the drawings, redundant descriptions will be omitted by denoting such elements with same reference signs and, at the same time, elements not directly related to the present invention will not be illustrated.

Figure 1B:
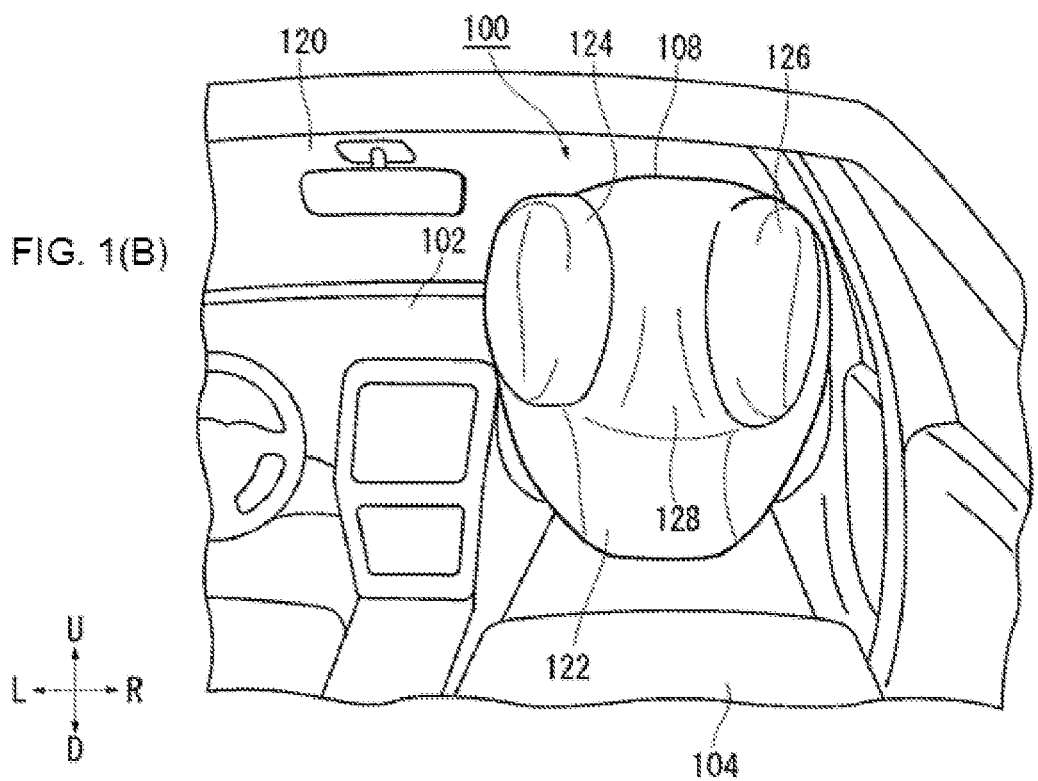

FIGS. 1(A) and 1(B) are diagrams illustrating an outline of an airbag device 100 according to an embodiment of the present invention. FIG. 1(A) is a diagram illustrating a vehicle before operation (deployment) of the airbag device 100. In FIG. 1(A) and other diagrams, vehicle longitudinal directions are respectively illustrated by arrows F (Forward) and B (Back), left and right in a vehicle width direction are respectively illustrated by arrows L (Left) and R (Right), and vehicle vertical directions are respectively illustrated by arrows U (up) and D (down).

In the present embodiment, the airbag device 100 is implemented as a passenger bag for a passenger seat (a front row, right-side seat 104) in a left-hand drive vehicle. Hereinafter, since a description will be given with the front row, right-side seat 104 in mind, for example, a vehicle outer side in the vehicle width direction means the right side of the vehicle and a vehicle inner side in the vehicle width direction means the left side of the vehicle.

An airbag cushion (hereinafter, a cushion 108 (refer to FIG. 1(B)) of the airbag device 100 is stored in a storage part 106 provided in an instrument panel 102. The storage part 106 is installed toward the front of the vehicle with respect to the seat 104 and also stores an inflator 118 (refer to FIG. 3(A)) which is a gas generating device in addition to the cushion 108.

FIG. 1(B) is a diagram illustrating the vehicle after operation of the airbag device 100 shown in FIG. 1(A). The cushion 108 is normally stored in the storage part 106 (refer to FIG. 1(A)) and inflates and deploys in front of the seat 104. The cushion 108 has a bag shape and is formed by laying a plurality of base fabric pieces or blanks constituting a surface thereof one on top of another and sewing, bonding, or spinning and weaving the plurality of base fabric using one-piece woven (OPW).

Figure 2A:
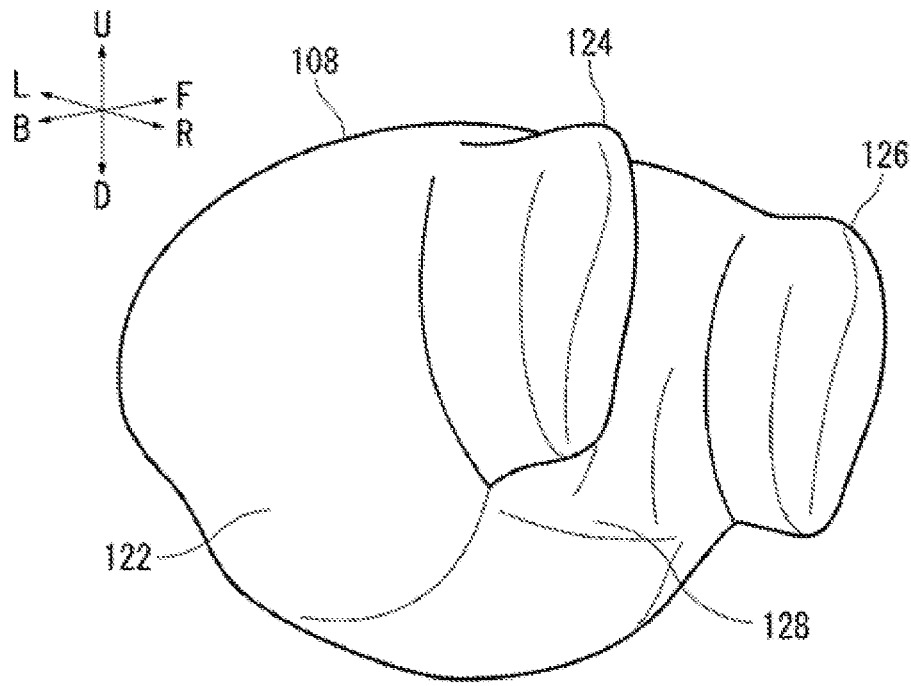
FIGS. 2(A) and 2(B) are diagrams illustrating, from respective directions, a cushion shown in FIG. 1(B) during expansion and deployment.
Figure 2B:
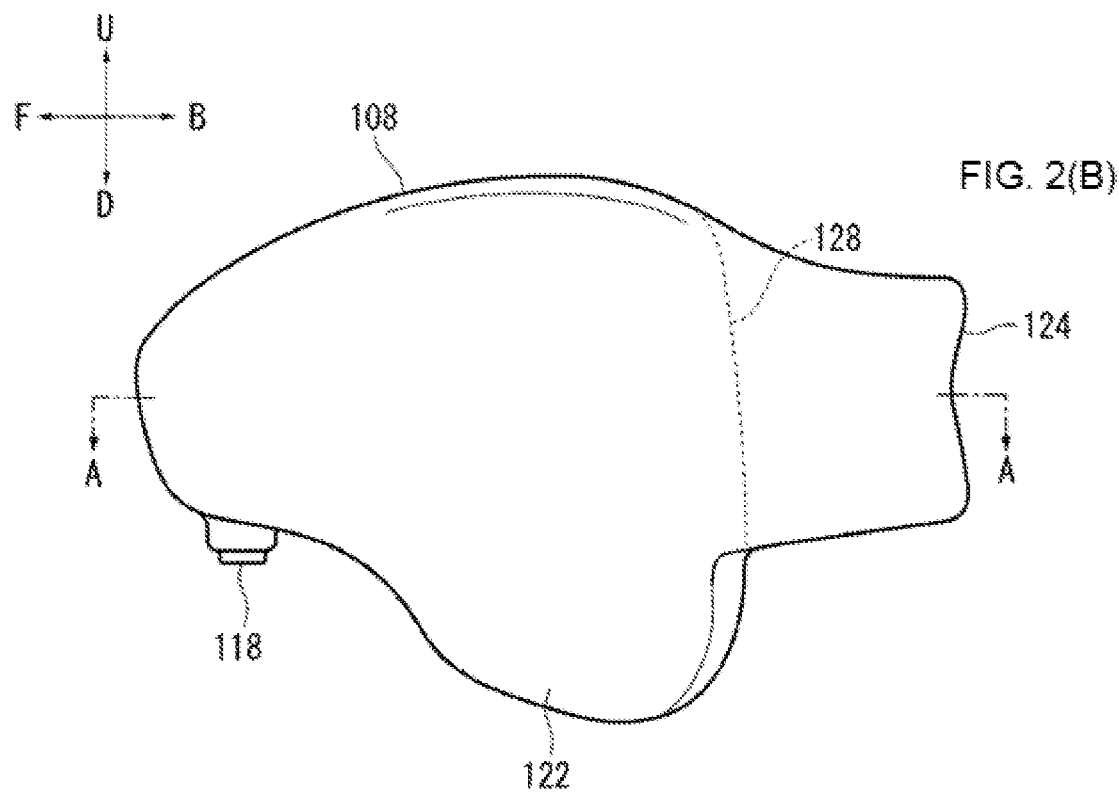

FIGS. 2(A) and 2(B) are diagrams illustrating, the cushion 108 shown in FIG. 1(B), from respective directions, during expansion and deployment. FIG. 2(A) is a perspective view illustrating the cushion 108 shown in FIG. 1(B) as viewed from a lower left side in the rear of the vehicle. The cushion 108 according to the present embodiment largely includes a base part 122 and two protrusions 124 and 126 provided on a vehicle rearward side of the base part 122.

The base part 122 is a part that occupies a large portion of the cushion 108. A portion of the base part 122 on a vehicle rearward side constitutes a forward restraining section 128 which restrains the head 146 of an occupant 144 (refer to FIG. 5(B)) from the front of the vehicle. Protrusions 124 and 126 are provided to both sides of the forward restraining section 128 in the vehicle width direction, and inflate so as to protrude further toward the rear of the vehicle than the forward restraining section 128 to mainly restrain a temporal region 148 of the occupant 144.

FIG. 2(B) is a diagram illustrating the cushion 108 shown in FIG. 1(B) as viewed from the vehicle inner side. From the storage part 106 (refer to FIG. 1(A)), the base part 122 inflates and deploys toward the rear of the vehicle so as to fill a space between an upper surface of the instrument panel 102 and a windshield 120. The protrusions 124 and 126 are provided on a slightly upper side in the rear of the vehicle with respect to the base part 122 and protrude in a near-rectangular shape from the base part 122.

Figure 3A:
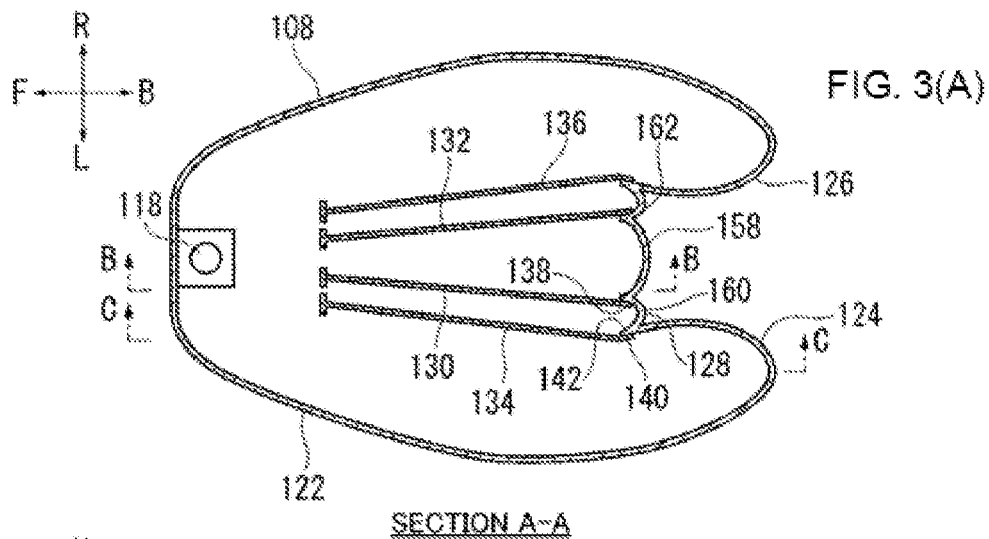
FIGS. 3(A) to 3(C) are sectional views of a cushion shown in FIG. 2(B)
Figure 3B:
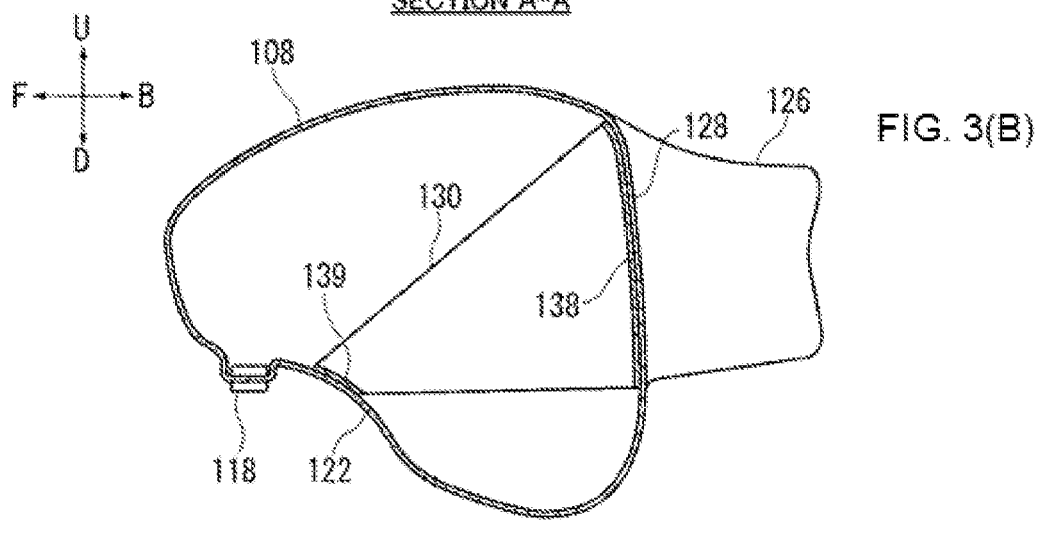
Figure 3C:
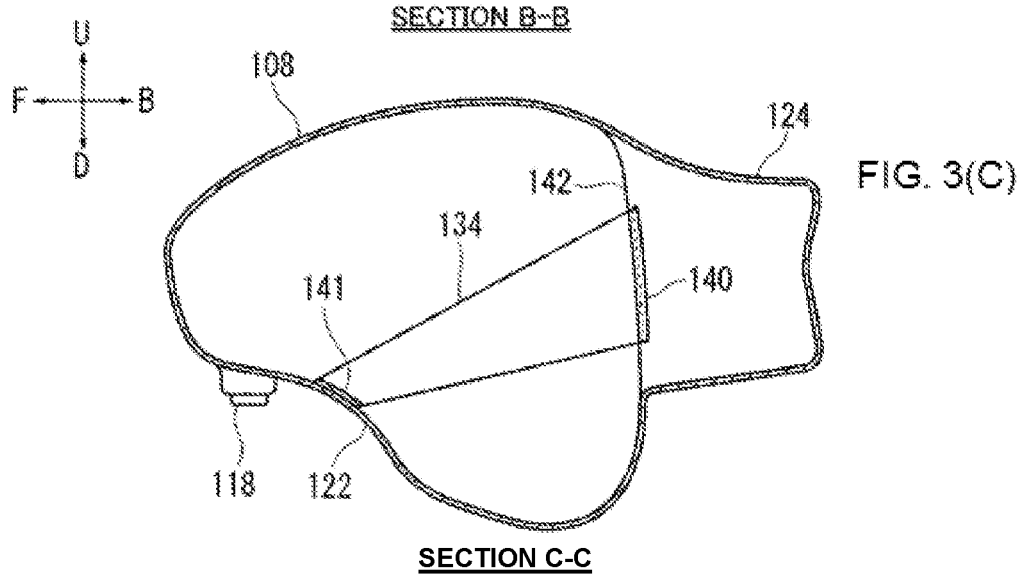

FIGS. 3(A) to 3(C) represent respective sectional views of the cushion 108 shown in FIG. 2(B). FIG. 3(A) is an A-A sectional view of the cushion 108 shown in FIG. 2(B). A part of the inflator 118 is inserted into the cushion 108. The inflator 118 is activated with a detection signal of an impact sent from a sensor (not shown) as a trigger, and supplies gas to the cushion 108. The cushion 108 starts inflating due to the gas from the inflator 118 and, using expansion pressure thereof, cleaves a cover 107 (refer to FIG. 1(A)) of the storage part 106 or the like, inflates and deploys toward the seat 104, and restrains the occupant from the front of the vehicle.

The inflator 118 is a disk-type inflator and is fixed to a rigid portion of the vehicle such as a cross beam inside the storage part 106 (refer to FIG. 1(A)) by having a part thereof being inserted into the base part 122. Currently widely used inflators include those which are filled by a gas generating agent and which burn the gas generating agent to generate gas, those which are filled with compressed gas and which supply gas without generating heat, and hybrid types which use both combustion gas and compressed gas. Any of these types and alternative shapes can be used as the inflator 118.

Two types of tethers, namely, inner tethers 130 and 132 and outer tethers 134 and 136 are provided inside the cushion 108 according to the present embodiment. The inner tethers 130 and 132 and the outer tethers 134 and 136 are both connected to the forward restraining section 128 inside the cushion 108 and, as the cushion 108 inflates and deploys, the inner tethers 130 and 132 and the outer tethers 134 and 136 are tensioned so as to pull the forward restraining section 128 toward the front of the vehicle. Accordingly, an inner inflating section 158 and outer inflating sections 160 and 162 (to be described later) are formed in the forward restraining section 128.

The outer tethers 134 and 136 are respectively connected to portions closer to the protrusions 124 and 126 than a center in the vehicle width direction in the forward restraining section 128. The inner tethers 130 and 132 are connected to portions at a prescribed distance from the outer tethers 134 and 136 toward a side of the center in the vehicle width direction in the forward restraining section 128. The inner tethers 130 and 132 and the outer tethers 134 and 136 can be provided using a same material as the base fabric constituting the cushion 108.

FIG. 3(B) is a B-B sectional view of the cushion 108 shown in FIG. 3(A). FIG. 3(B) illustrates the inner tether 130 as a representative of the inner tethers 130 and 132. Since the inner tethers 130 and 132 share a same configuration, the inner tether 130 will be referred to as a representative.

The inner tether 130 is provided in a shape that gradually spreads from a vehicle forward side toward a rear side, and an end 138 thereof is joined to the forward restraining section 128. Another end 139 of the inner tether 130 is connected to a portion opposing the forward restraining section 128 inside the cushion 108 and, particularly, to a bottom portion on the vehicle forward side which comes into contact with the instrument panel 102 (refer to FIG. 1(A)). According to this configuration, the inner tether 130 is capable of efficiently pulling the forward restraining section 128 toward the vehicle forward side as the cushion 108 inflates and deploys.

FIG. 3(C) is a C-C sectional view of the cushion 108 shown in FIG. 3(A). FIG. 3(C) illustrates the outer tether 134 as a representative of the outer tethers 134 and 136. Since the outer tethers 134 and 136 share a same configuration, the outer tether 134 will be referred to as a representative.

As illustrated in FIG. 3(C), the outer tether 134 is also provided in a shape that slightly spreads from the vehicle forward side toward the rear side, and an end 140 thereof is connected close to a root 142 of the protrusion 124 at an end of the forward restraining section 128 in the vehicle width direction. In a similar manner to the inner tether 130 (refer to FIG. 3(B)), another end 141 of the outer tether 134 is connected to a portion which faces the forward restraining section 128 inside the cushion 108 and which is a bottom portion on the vehicle forward side which comes into contact with the instrument panel 102 (refer to FIG. 1(A)). According to this configuration, the outer tether 134 can efficiently pull the forward restraining section 128 toward the vehicle forward side as the cushion 108 inflates and deploys.

As illustrated in FIG. 3(A), the inner inflating section 158 and the outer inflating sections 160 and 162 are formed in the forward restraining section 128 by the inner tethers 130 and 132 and the outer tethers 134 and 136. The inner inflating section 158 inflates so as to convexly curve and protrude toward the occupant on a center side in the vehicle width direction with respect to the inner tethers 130 and 132 in the forward restraining section 128. The outer inflating sections 160 and 162 temporarily inflate so as to convexly curve and protrude toward the occupant between the outer tethers 134 and 136 and the inner tethers 130 and 132 in the forward restraining section 128.

In the present embodiment, using the inner inflating section 158 and the outer inflating section 160, a force oriented toward a side of the inner inflating section 158 can be created in the protrusion 124 and an occupant restraining force of the protrusions 124 and 126 can be further improved. Hereinafter, a process by which the cushion 108 restrains the occupant 144 will be described with reference to FIGS. 4(A) to 4(C) and FIGS. 5(A) and 5(B).

FIGS. 4(A) to 4(C) and FIGS. 5(A) and 5(B) are diagrams illustrating an inflation (deployment) process of the cushion 108 shown in FIG. 3(A) restraining the occupant 144. As illustrated in FIG. 4(A), the cushion 108 is stored toward the front of the vehicle relative to the occupant 144 sitting on the seat 104. When an impact occurs on the vehicle as illustrated in FIG. 4(B), an operation signal is transmitted to the airbag device 100 from a sensor (not shown) and the cushion 108 inflates and deploys by cleaving the cover 107 (refer to FIG. 1(A)). In addition, as illustrated in FIG. 4(C), the cushion 108 inflates toward the rear of the vehicle toward the occupant 144.

Figure 5A:
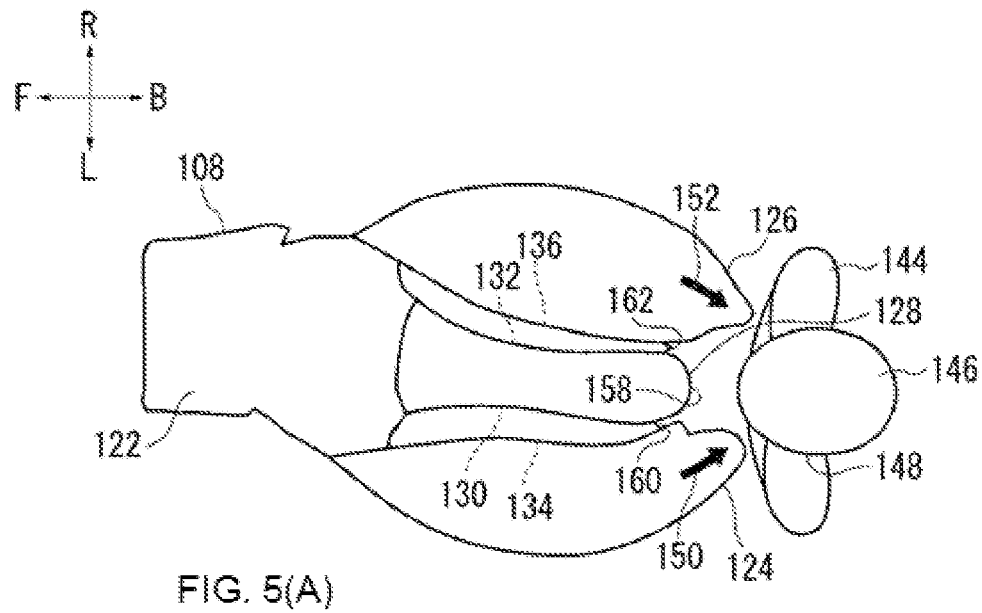
FIGS. 5(A) and 5(B) are diagrams illustrating a process of deployment of the cushion shown in FIG. 3(A) restraining an occupant.

As illustrated in FIG. 5(A), inside the cushion 108, one each of the inner tethers 130 and 132 and the outer tethers 134 and 136 is provided on the left side in the vehicle width direction and the remaining inner and outer tethers are provided on the right side in the vehicle width direction. The inner tethers 130 and 132 have one end connected to a portion constituting a boundary between the inner inflating section 158 and the outer inflating sections 160 and 162 in the forward restraining section 128, and the outer tethers 134 and 136 have one end connected to a portion constituting a boundary between the outer inflating sections 160 and 162 and the protrusions 124 and 126 in the forward restraining section 128. As the inner tethers 130 and 132 and the outer tethers 134 and 136 are tensioned with the expansion and deployment of the cushion 108 and pull the respective portions of the forward restraining section 128 toward the front of the vehicle, the inner inflating section 158 and the outer inflating sections 160 and 162 convexly inflate toward the rear of the vehicle.

The cushion 108 inflates toward the rear from the front of the vehicle with respect to the occupant 144 so as to restrain the head 146 of the occupant 144 with particularly the inner inflating section 158 in the forward restraining section 128. However, during an oblique collision, the occupant 144 may not only move toward the front of the vehicle from the seat 104 (refer to FIG. 1(A) and the like) but may also move obliquely forward on the vehicle inner side. In consideration thereof, in the present embodiment, the protrusions 124 and 126 are provided so as to protrude to the vehicle rearward side from both sides of the forward restraining section 128 in the vehicle width direction.

Figure 5B:
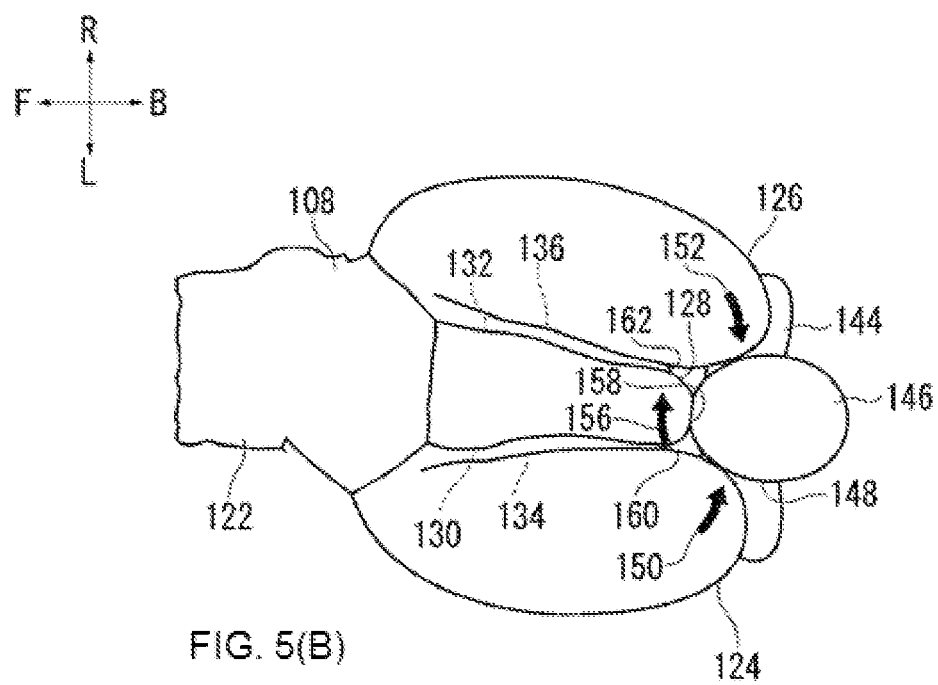

FIG. 5(B) is a diagram showing the occupant 144 in FIG. 5(A) having further approached toward the side of the cushion 108. As illustrated in FIG. 5(B), for example, when the occupant 144 is moving forward-left, the cushion 108 first restrains the head 146 of the occupant 144 from the front of the vehicle with the inner inflating section 158 in the forward restraining section 128. In addition, the cushion 108 restrains the head 146 of the occupant 144 from the side of the temporal region 148 with the protrusion 124.

In the state shown in FIG. 5(B), a force oriented toward the side of the inner inflating section 158 is applied to the protrusion 124 and enables the head 146 to be restrained more preferably. More specifically, the protrusion 124 squashes the outer inflating section 160 so as to sandwich the outer inflating section 160 between the protrusion 124 and the inner inflating section 158 and restrains the occupant 144 by being in a posture of being pulled toward the side of the inner inflating section 158.

Let us now refer to FIG. 3(A) once again. The outer inflating sections 160 and 162 are provided to both sides of the inner inflating section 158 in the vehicle width direction and inflate within a smaller range than the expansion range of the inner inflating section 158 and the protrusions 124 and 126. More specifically, in the present practical example, the outer inflating sections 160 and 162 inflate within a small range in the vehicle width direction (a left-right direction indicated by arrows L and R). In other words, connecting locations of the inner tethers 130 and 132 and the outer tethers 134 and 136 are set such that curvature radii of the outer inflating sections 160 and 162 when inflated toward the occupant become smaller than curvature radii of the inner inflating section 158 and the protrusions 124 and 126.

Figure 6:
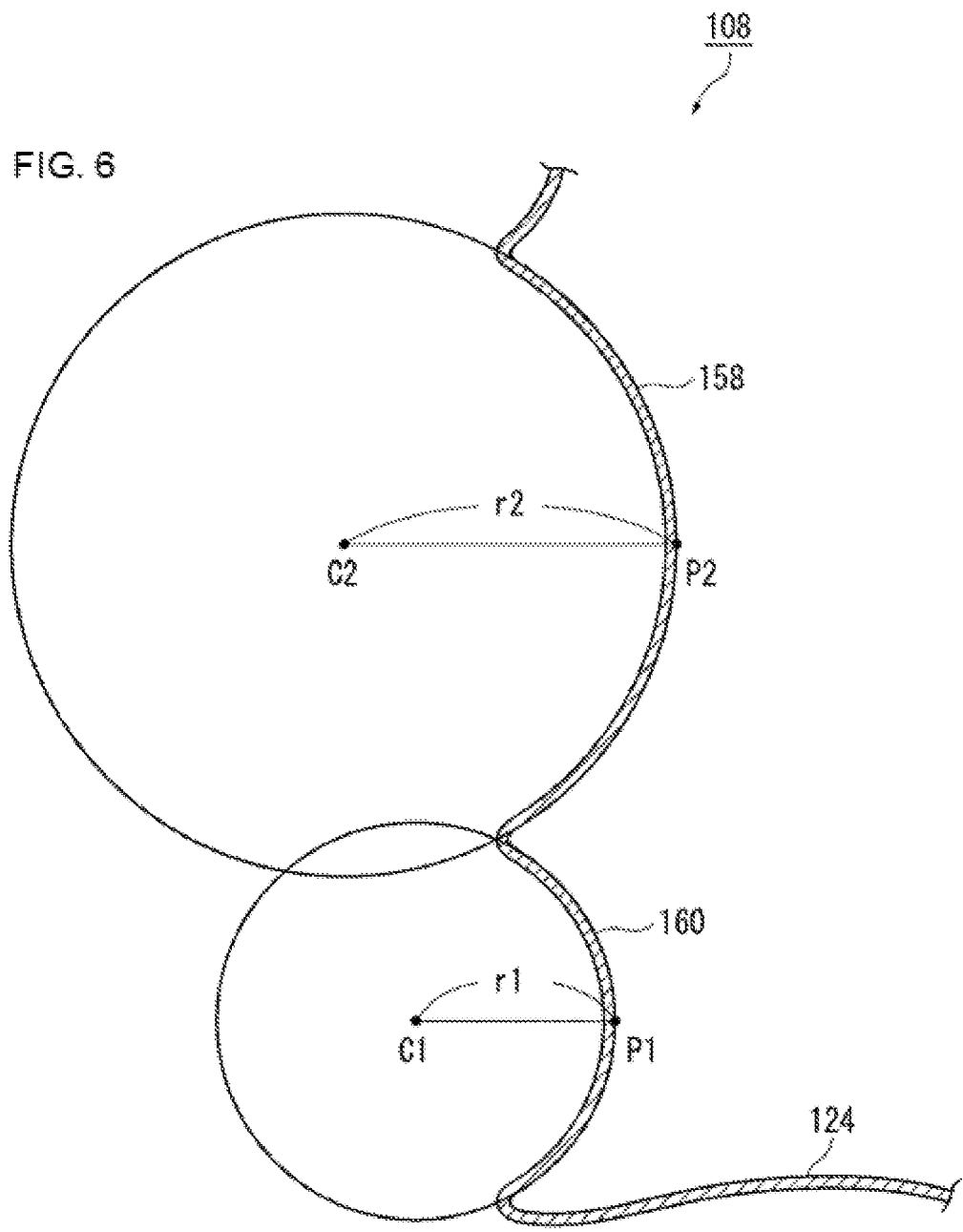
FIG. 6 is an enlarged view of a vicinity of an outer inflating section and an inner inflating section shown in FIG. 3(A)

FIG. 6 is an enlarged view of a vicinity of the outer inflating section 160 and the inner inflating section 158 shown in FIG. 3(A). In FIG. 6, a circle (center C1) along a curvature of the outer inflating section 160 and a circle (center C2) along a curvature of the inner inflating section 158 are schematically shown. As illustrated in FIG. 6, a curvature radius r1 (a radius connecting the center C1 with a point P1 on a surface) of the outer inflating section 160 is set smaller than a curvature radius r2 (a radius connecting the center C2 with a point P2 on a surface) of the inner inflating section 158 (curvature radius r1<curvature radius r2). In addition, although not illustrated, the curvature radius r1 of the outer inflating section 160 is set smaller than the curvature radius of the protrusion 124.

According to the configuration described above, a rigidity of the outer inflating section 160 is lower than rigidities of the inner inflating section 158 and the protrusion 124. Therefore, during expansion and deployment of the cushion 108, the outer inflating section 160 is squashed by the inner inflating section 158 and the protrusion 124 and, as a result, the protrusion 124 is in a posture of being pulled toward the side of the inner inflating section 158 (refer to FIG. 5(B)). In this manner, the outer inflating sections 160 and 162 according to the present embodiment are provided as portions that temporarily inflate while the cushion 108 inflates and deploys.

According to the configuration described above, forces 150 and 152 oriented toward the side of the inner inflating section 158 are applied to the protrusions 124 and 126 shown in FIG. 5(B) so as to respectively squash the outer inflating sections 160 and 162 between the protrusions 124 and 126 and the inner inflating section 158. Therefore, for example, with the protrusion 124 that is positioned closer to the occupant 144, a restraining force with respect to the head 146 of the occupant 144 is improved. The forces 150 and 152 of the protrusions 124 and 126 can also be adjusted by adjusting lengths of the outer tethers 134 and 136. For example, by shortening the outer tethers 134 and 136, tension applied to the protrusions 124 and 126 increases and the forces 150 and 152 increase.

In the present embodiment, even a rotation of the head 146 of the occupant 144 can be absorbed by the protrusion 124 and an injury value of the occupant 144 can be efficiently suppressed. In particular, forces 150 and 152 oriented so as to narrow a space between the protrusions 124 and 126 are respectively applied thereto and the protrusions 124 and 126 can restrain the head 146 of the occupant 144 by motions that enclose the head 146 from both sides. These motions enable the protrusions 124 and 126 to exhibit high occupant restraining forces with respect to the head 146 of the occupant 144.

During an oblique collision or the like, when the head 146 of the occupant 144 moving obliquely forward comes into contact with the cushion 108 in front of the seat 104 (refer to FIG. 1(A) and the like), a clockwise rotational force (a rotation 156 illustrated by an arrow) around the neck as viewed from above may act on the head 146. It has been proven that such a rotation 156 of the head 146 is likely to increase an injury value of the occupant 144. However, in the present embodiment, using the inner inflating section 158 and the protrusions 124 and 126, a portion of the head 146 from a front side to the temporal region 148 can be proactively restrained and the rotation 156 that is created on the head 146 can be reduced or canceled out and absorbed. According to this configuration, an angular velocity of the rotation 156 of the head 146 of the occupant 144 can be reduced and an injury value of the head 146 as a result of the rotation 156 can be suppressed.

Even if the outer inflating sections 160 and 162 in FIG. 5(B) are not squashed by the inner inflating section 158 and the protrusions 124 and 126 and retain their shapes, the protrusions 124 and 126 can absorb the rotation 156 of the head 146 of the occupant 144 and suppress the injury value. This is because, since the outer inflating sections 160 and 162 convexly inflate toward the rear of the vehicle within a small range in the vehicle width direction, an effect of pulling the protrusions 124 and 126 toward the side of the inner inflating section 158 is produced when the head 146 of the occupant 144 comes into contact with the inner inflating section 158.

Let us now refer to FIG. 3(B) once again. The one end 138 of the inner tether 130 has a vertical dimension sufficient to cover a vertical range of the protrusion 124. According to this configuration, the outer inflating sections 160 and 162 (refer to FIG. 3A) are formed so as to cover the vertical range of the protrusion 124. Therefore, in the present embodiment, forces oriented toward the side of the inner inflating section 158 can be efficiently created on the protrusions 124 and 126. A similar effect can be produced by setting the one end 140 of the outer tether 134 shown in FIG. 3(C) to a vertical dimension sufficient to cover the vertical range of the protrusion 124. In other words, at least one of the one end 138 of the inner tether 130 and the one end of the outer tether 134 preferably has a vertical dimension sufficient to cover the vertical range of the protrusion 124.

FIGS. 7(A) and 7(B) and FIGS. 8(A) to 8(C) are diagrams illustrating modifications of the cushion 108 shown in FIG. 3(A) and the like. Hereinafter, a description of a component that is the same as an already-described component will be omitted by denoting the component using a same reference sign. In addition, unless otherwise described, it is assumed that a component sharing a same name as an already-described component has a same function as the already-described component even when denoted by a different reference sign.

Figure 7A:
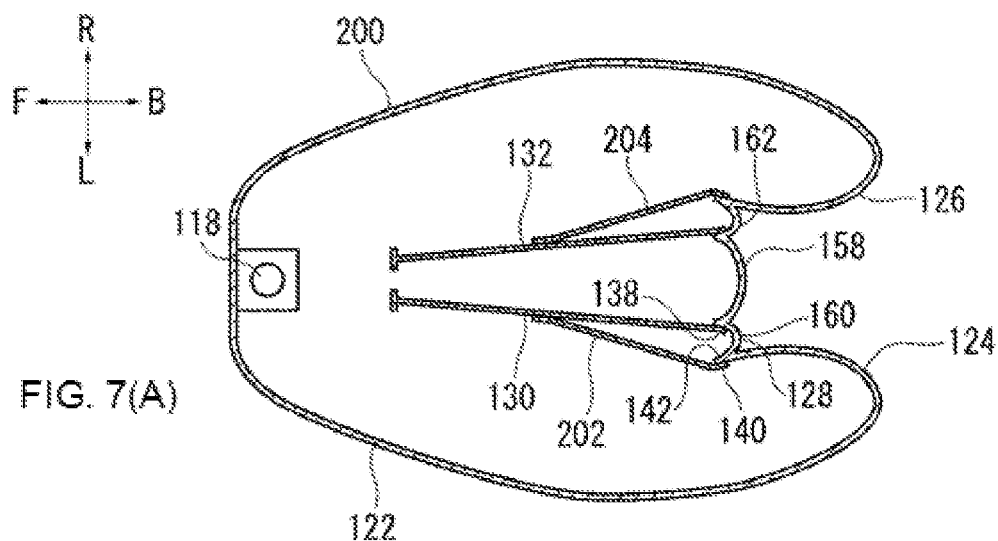

FIG. 7(A) is a diagram illustrating a first modification of the cushion 108 corresponding to FIG. 3(A). In a cushion 200 illustrated in FIG. 7(A), outer tethers 202 and 204 are connected to central portions of the inner tethers 130 and 132. Therefore, the inner tether 130 and the outer tether 202, and the inner tether 132 and the outer tether 204 respectively form integrated bifurcated tethers. Even with this configuration, the inner tethers 130 and 132 and the outer tethers 202 and 204 can efficiently pull the forward restraining section 128 toward the front of the vehicle and the inner inflating section 158 and the outer inflating section 160 can be preferably formed.

Figure 7B:
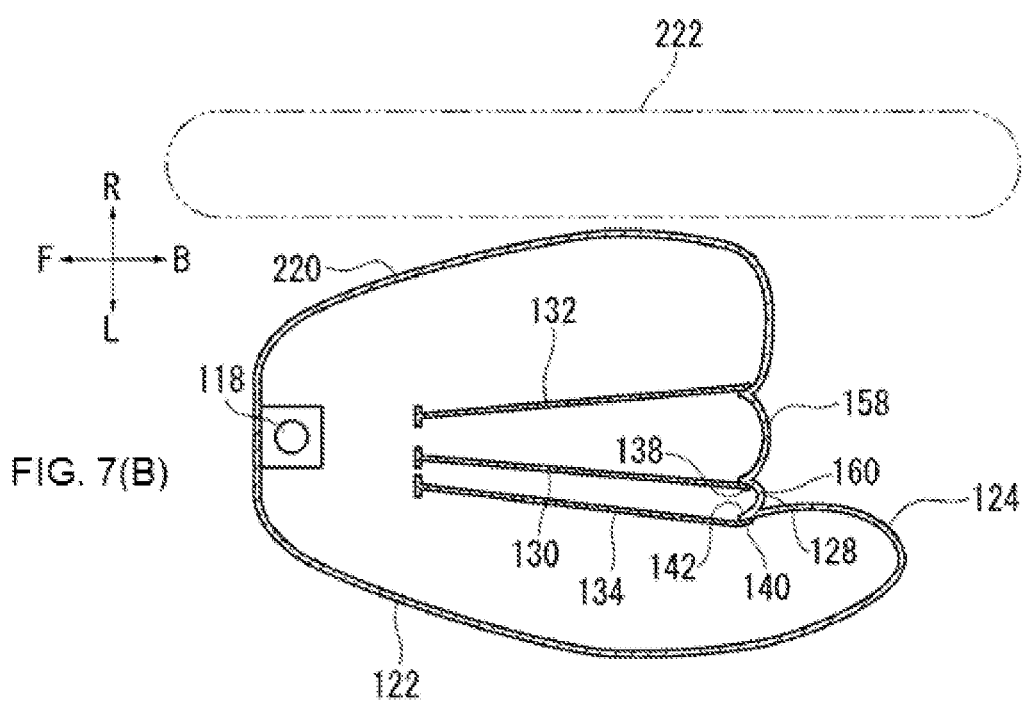

FIG. 7(B) is a diagram illustrating a second modification of the cushion 108 corresponding to FIG. 3(A). As in a cushion 220 illustrated in FIG. 7(B), only one protrusion 124 can be provided on one side in the vehicle width direction of the forward restraining section 128.

For example, there may be a case where a curtain airbag 222 is provided on a right side in the vehicle width direction with respect to the passenger bag illustrated in FIG. 1(B). In this case, as illustrated in FIG. 7(B), even by providing the cushion 220 with the protrusion 124 and the outer tether 134 only on a left side (a vehicle inner side) in the vehicle width direction and omitting the protrusion 126 (refer to FIG. 3(A)) and performing restraining by the curtain airbag 222 on a right side in the vehicle width direction, an injury value of the occupant 144 (refer to FIG. 5(B)) moving toward the vehicle inner side during an oblique collision can be suppressed and the occupant 144 can be efficiently restrained.

As described above, the protrusion 124 and the outer tether 134 can suppress the injury value of the occupant even when provided on one side in the vehicle width direction of the forward restraining section 128. In addition, the inner tethers 130 and 132 can also be provided together with the outer tether 134 on one side in the vehicle width direction of the forward restraining section 128 as long as the shape of the inner inflating section 158 can be retained.

Figure 8A:
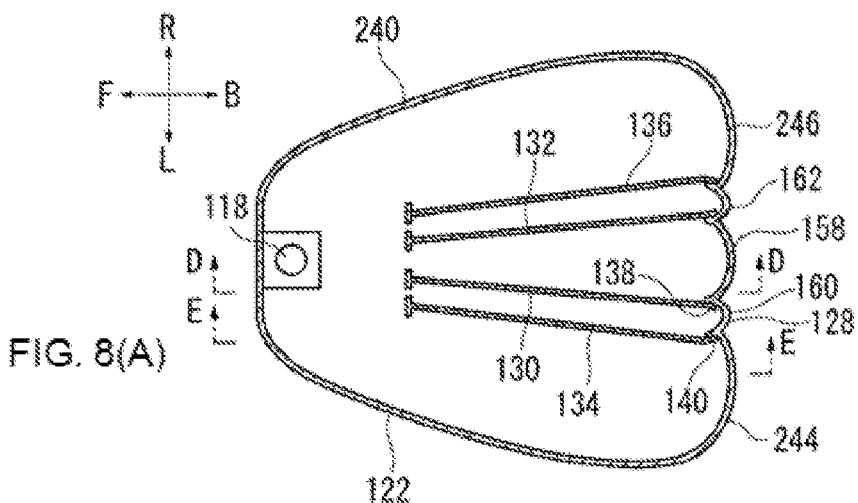
Figure 8B:
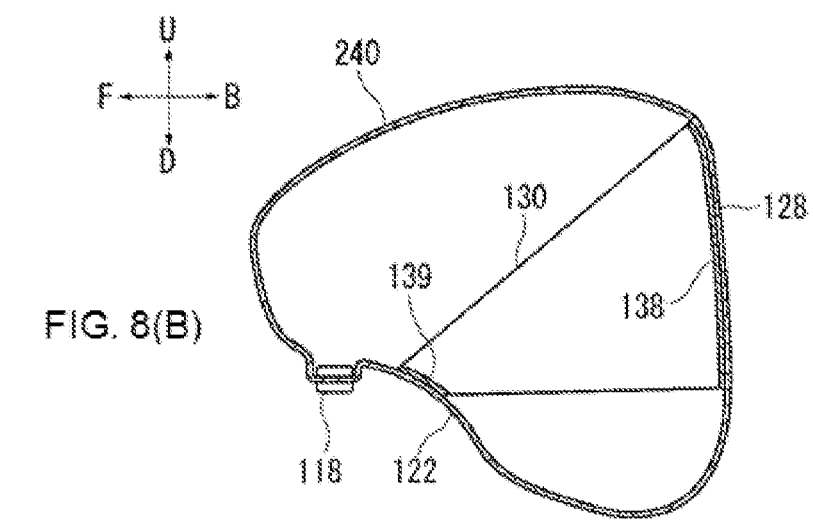
Figure 8C:
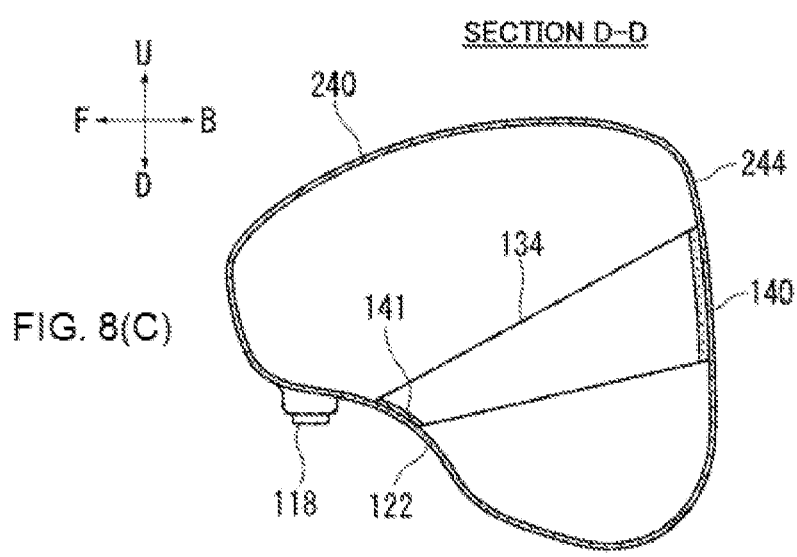

FIGS. 8(A) to 8(C) are diagrams illustrating a third modification of the cushion 108 corresponding to FIGS. 3(A) to 3(C). As illustrated in FIG. 8(A), a cushion 240 differs from the cushion 108 in that protrusions 244 and 246 thereof inflate so as to protrude toward the rear of the vehicle by an amount comparable to the protruding amount of the inner inflating section 158. This is as illustrated in FIGS. 8(B) and 8(C) which represent a D-D sectional view and an E-E sectional view of the cushion 240 shown in FIG. 8(A).

As described above, even when the protrusions 244 and 246 inflate so as to protrude toward the rear of the vehicle by an amount comparable to the protruding amount of the inner inflating section 158, an effect of pulling the protrusions 244 and 246 toward the side of the inner inflating section 158 can be obtained. Therefore, a restraining force of the temporal region of the occupant by the protrusions 244 and 246 is improved than before, and a rotation of the head of the occupant can be absorbed and an injury value of the occupant can be efficiently suppressed.

Although a preferred embodiment of the present invention has been described above with reference to the accompanying drawings, it is needless to say that the present invention is not limited to the example. It will be obvious to those skilled in the art that various modifications or corrections may be made without departing from the scope of the claims, and it is to be understood that such modifications and corrections will fall within the technical scope of the present invention.

The present invention can be used in an airbag device which is installed in a vehicle and which includes a bag-like cushion that inflates and deploys in front of a seat.

While the above description constitutes the preferred embodiment of the present invention, it will be appreciated that the invention is susceptible to modification, variation and change without departing from the proper scope and fair meaning of the accompanying claims.

The invention claimed is:

1. An airbag device adapted to be installed in a vehicle for restraint of an occupant and which includes a bag-like cushion that inflates and deploys in front of a seat, the cushion comprising:
   an inner inflating section which convexly inflates toward the rear of the vehicle and is adapted to restrain the head of the occupant;

at least one protrusion which is provided to a side of the inner inflating section in a vehicle width direction and which is capable of inflating so as to protrude further toward the rear of the vehicle than the inner inflating section; and at least one outer inflating section which is provided between the inner inflating section and the protrusion and which convexly inflates toward the rear of the vehicle within a smaller range in the vehicle width direction than an expansion range of the inner inflating section and an expansion range of the protrusion, wherein a curvature radius of the outer inflating section when inflating is smaller than a curvature radius of the inner inflating section and a curvature radius of the protrusion such that, upon a restraint of the occupant, the outer inflating section is squashed by the inner inflating section and the protrusion, and the protrusion is adapted to being pulled toward a side of the inner inflating section.

2. An airbag device adapted to be installed in a vehicle for restraint of an occupant and which includes a bag-like cushion that inflates and deploys in front of a seat, the cushion comprising:

an inner inflating section which convexly inflates toward the rear of the vehicle and is adapted to restrain the head of the occupant;

at least one protrusion which is provided to a side of the inner inflating section in a vehicle width direction and which is capable of inflating so as to protrude toward the rear of the vehicle; and at least one outer inflating section which is provided between the inner inflating section and the protrusion and which convexly inflates toward the rear of the vehicle within a smaller range in the vehicle width direction than an expansion range of the inner inflating section in the vehicle width direction and an expansion range of the protrusion in the vehicle width direction, wherein a curvature radius of the outer inflating section when inflating is smaller than a curvature radius of the inner inflating section and a curvature radius of the protrusion.

3. The airbag device according to claim 2 further comprising, the at least one protrusion is capable of inflating so as to protrude further toward the rear of the vehicle than a protruding amount of the inner inflating section.

4. The airbag device according to claim 2 further comprising, the at least one protrusion is capable of inflating so as to protrude toward the rear of the vehicle by an amount comparable to a protruding amount of the inner inflating section.

5. The airbag device according to claim 2 further comprising, the at least one outer inflating section convexly inflates toward the rear of the vehicle within a smaller range in a vehicle width direction than an expansion range in the vehicle width direction of the inner inflating section and an expansion range in the vehicle width direction of the protrusion.

6. The airbag device according to claim 2 further comprising, in a restraint event the outer inflating section is adapted to be squashed by the inner inflating section and the protrusion, and the protrusion is adapted to being pulled toward a side of the inner inflating section.

7. The airbag device according to claim 2 further comprising, the protrusion is provided to both sides of a forward restraining section in the vehicle width direction and the inner and outer inflating sections form at least a part of the forward restraining section.

8. The airbag device according to claim 2 further comprising, at least one inner tether having one end connected to a first portion constituting a boundary between the inner inflating section and the outer inflating section inside the cushion, and which is tensioned during an inflation so as to pull the first portion in a direction toward the front of the vehicle; and at least one outer tether having one end connected to a second portion constituting a boundary between the outer inflating section and the protrusion inside the cushion, and which is tensioned during the inflation so as to pull the second portion in a direction toward the front of the vehicle.

9. The airbag device according to claim 8 further comprising, the outer inflating section is provided on both sides of the inner inflating section in the vehicle width direction, and the inner tether and the outer tether are provided singly on each of a left and a right sides in the vehicle width direction.

10. The airbag device according to claim 8 further comprising, at least one of the one end of the outer tether and the one end of the inner tether each have a vertical dimension sufficient to cover a vertical range of the protrusion.

11. The airbag device according to claim 8 further comprising, other opposite ends of the outer tether and the inner tether are connected to a portion of the cushion that faces a forward restraining section inside the cushion.

12. The airbag device according to claim 8 further comprising, the one end of the inner tether having a greater first vertical dimension than a second vertical dimension of the one end of the outer tether.

13. The airbag device according to claim 8 further comprising, a second end of the inner tether and a second end of the outer tether are affixed to a base part of the airbag.

14. The airbag device according to claim 8 further comprising, one of a second end of the inner tether and a second end of the outer tether is affixed to a base part of the airbag and one of another end of the second end of the inner tether and the second end of the outer tether is affixed to another of the inner tether or the outer tether.

* * * * *